United States Patent [19]

Katayama et al.

[11] Patent Number: 4,880,215

[45] Date of Patent: Nov. 14, 1989

[54] FLUID-FILLED ELASTIC MOUNTING STRUCTURE

[75] Inventors: Motohiro Katayama, Kasugai; Tatsuya Suzuki, Komaki, both of Japan

[73] Assignee: Tokai Rubber Industries, Ltd., Japan

[21] Appl. No.: 228,676

[22] Filed: Aug. 5, 1988

[51] Int. Cl.$^4$ .......................... F16F 13/00; B60K 5/12
[52] U.S. Cl. .................................. 267/140.1; 267/35; 248/562; 248/636
[58] Field of Search ...................... 267/121, 140.1, 141, 267/35, 219; 248/659, 638, 562, 636

[56] References Cited

U.S. PATENT DOCUMENTS 4,708,329 11/1987 Tabata et al. .................... 267/140.1

FOREIGN PATENT DOCUMENTS

| 104824 | 6/1985 | Japan. | |
| 0155029 | 8/1985 | Japan | 267/140.1 |
| 249749 | 12/1985 | Japan. | |
| 0127536 | 6/1987 | Japan | 267/140.1 |
| 0147139 | 7/1987 | Japan | 267/140.1 |
| 0209242 | 9/1987 | Japan | 267/140.1 |

OTHER PUBLICATIONS

An Analysis of the Velocity Amplifying Dynamic Camper Mechanism and its Applications, Masaru Sugino, Eiichi Abe; the Treatises of the Japan Mechanical Society (part C), vol. 52, No. 483 (Nov. 1986), pp. 2839–2842, Paper No. 85-1110B.

Primary Examiner—Douglas C. Butler
Assistant Examiner—Mark T. Le
Attorney, Agent, or Firm—Oliff & Berridge

[57] ABSTRACT

A fluid-filled elastic mount for flexible coupling of two members includes a first support member and a second support member, an elastic body interposed between the first and second support members, a closure member for partially defining a fluid chamber filled with a non-compressible fluid, a first partition device for dividing the fluid chamber into a pressure-receiving chamber and an equilibrium chamber, and a device for defining a first restricted passage for restricted fluid communication between the pressure-receiving chamber and the equilibrium chamber. The fluid-filled elastic mount further includes a second partition member having a peripheral portion secured to an intermediate portion of the elastic body. The second partition member is adapted to divide the pressure-receiving chamber into a first section formed on the side of the first support member, and a second section formed on the side of the first partition device, and has a second restricted passage for restricted fluid communication between the first and second sections of the pressure-receiving chamber.

9 Claims, 1 Drawing Sheet

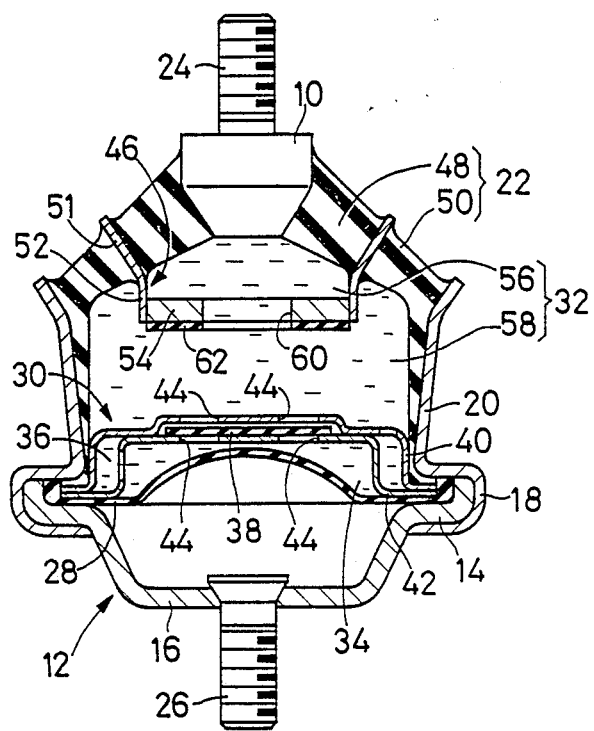

& # 35; 4,880,215

FLUID-FILLED ELASTIC MOUNTING STRUCTURE

BACKGROUND OF THE INVENTION

1. Field of the Invention

The present invention relates in general to a fluid-filled elastic mounting structure suitably used as a mount to mount for example an engine of a motor vehicle, and more particularly to such a fluid-filled mounting structure capable of effectively damping and isolating input vibrations in various frequency ranges.

2. Discussion of the Prior Art

An elastic mounting structure such as an engine mount for an automotive vehicle is generally required to effectively damp and isolate input vibrations in a wide frequency range, in particular, to sufficiently damp the vibrations having large-amplitudes and low frequencies. To meet these requirements, there has been proposed a so-called fluid-filled elastic mount as disclosed in laid-open publications Nos. 60-104824 and 60-249749 of unexamined Japanese Patent Applications. The disclosed elastic mount comprises (a) first support means and second support means which are disposed opposite to each other in a load-receiving direction in which a vibrational load is applied to the elastic mount, (b) an elastic body interposed between the first and second support means, for elastic connection of the first and second support means, (c) a closure member secured to the second support means and cooperating with at least the elastic body to define a fluid chamber filled with a non-compressible fluid, the closure member including a flexible portion, (d) partition means for dividing the fluid chamber into a pressure-receiving chamber formed on the side of the first support means, and an equilibrium chamber formed on the side of the second support means, (e) means for defining a first restricted passage for restricted fluid communication between the pressure-receiving chamber and the equilibrium chamber, and (f) an operating member protruding from the first support means into the pressure-receiving chamber, for substantially dividing the pressure-receiving chamber into a first section formed on the side of the first support means, and a second section formed on the side of the partition means.

In the known fluid-filled elastic mount constructed as described above, vibrations applied to the mount cause the non-compressible fluid to flow between the pressure-receiving chamber and the equilibrium chamber, through the first restricted passage, so that the elastic mount can effectively damp the input vibrations in a given frequency range which is determined by the configuration and dimensions of the restricted passage. Usually, the restricted passage is tuned to a low frequency range so that the large-amplitude, low frequency vibrations can be effectively damped due to restricted fluid flows though the first restricted passage. According to the known elastic mount as described above, the non-compressible fluid existing in the pressure-receiving chamber flows between the first and second sections of the chamber, through a restricted portion defined between the periphery of the operating member and an appropriate portion of the inner surface of the pressure-receiving chamber. As a result, the elastic mount can effectively damp or isolate the small-amplitude vibrations in an intermediate or high frequency range which is determined by controlling the configuration and dimensions of the restricted portion.

As discussed above, the known fluid-filled elastic mount can effectively isolate the input vibrations in a specific frequency range determined by the restricted portion defined between the operating member and the inner surface of the pressure-receiving chamber, based on the restricted fluid flows through the restricted portion. However, where the elastic mount is subjected to vibrations in a higher frequency range than the determined specific frequency range, the fluid is less likely to flow through the restricted portion. This leads to a considerable increase in the dynamic spring constant of the elastic mount, and accordingly reduced damping or isolating capability of the elastic mount.

SUMMARY OF THE INVENTION

It is therefore an object of the present invention to provide an improved fluid-filled elastic mount capable of damping and isolating applied vibrations in a wide frequency range, while ameliorating the inconvenience encountered on the known counterpart discussed above.

According to the present invention, there is provided a fluid-filled elastic mount for flexible coupling of two members, comprising (a) first support means and second support means which are disposed opposite to each other in a load-receiving direction in which a vibrational load is applied to the elastic mount, (b) an elastic body interposed between the first and second support means, for elastic connection of the first and second support means, (c) a closure member secured to the second support means and cooperating with at least the elastic body to define a fluid chamber filled with a non-compressible fluid, the closure member including a flexible portion, (d) first partition means for dividing the fluid chamber into a pressure-receiving chamber formed on the side of the first support means, and an equilibrium chamber formed on the side of the second support means, (e) means for defining a first restricted passage for restricted fluid communication between the pressure-receiving chamber and the equilibrium chamber, and (f) second partition means having a peripheral portion secured to an intermediate portion of the elastic body which is intermediate between the first and second support means. The second partition means is adapted to divide the pressure-receiving chamber into a first section formed on the side of the first support means, and a second section formed on the side of the first partition means. Further, the second partition means includes means for defining a second restricted passage for restricted fluid communication between the first and second sections of the pressure-receiving chamber.

In the fluid-filled elastic mount of the present invention constructed as described above, upon application of vibrations in the load-receiving direction, there arises a pressure difference between the first and second sections of the pressure-receiving chamber due to an elastic deformation of the rubber block. As a result, the non-compressible fluid existing in the pressure-receiving chamber is caused to flow between the two sections through the second restricted passage. Accordingly, the elastic mount is capable of effectively damping or isolating input vibrations in a specific frequency range to which the second restricted passage is tuned.

Further, the elastic mount of the invention can effectively damp or isolate applied vibrations in a frequency range determined by the first restricted passage, due to restricted fluid communication between the pressure-receiving chamber and equilibrium chamber, through the first restricted passage, as known in the art.

More specifically, the first restricted passage is tuned to a low frequency range while the second restricted passage is tuned to an intermediate or high frequency range. Thus, the elastic mount can exhibit excellent damping and isolating characteristics for the large-amplitude, low frequency vibrations and small-amplitude, intermediate or high frequency vibrations, as exhibited by the known elastic mount having the operating member.

Where the frequencies of the vibrations applied to the known elastic mount are higher than the predetermined frequency range to which the second restricted passage is tuned, the non-compressible fluid tends to be prevented from easily flowing between the first and second sections of the pressure-receiving chamber, through the second restricted passage. Consequently, the known elastic mount tends to have an increased dynamic spring constant and accordingly reduced damping or isolating capability. However, the dynamic spring constant of the elastic mount according to the present invention can be maintained at a comparatively low value since the increase in the fluid pressure in the two sections of the pressure-receiving chamber can be effectively avoided due to elastic expansion of the elastic body. Thus, the instant elastic mount demonstrates improved damping or isolating characteristics.

To sum up, the fluid-filled elastic mount according to the present invention has excellent isolating capability for considerably high frequency vibrations, while exhibiting damping and isolating characteristics as provided in the known elastic mount having the operating member. That is, the elastic mount of the invention has more excellent isolating characteristics for vibrations in a high frequency range than the known elastic mount.

According to one advantageous feature of the invention, the second partition means comprises a hollow member which has a first portion embedded in the intermediate portion of the elastic body so as to separate the elastic body into a part secured to the first support means and a part secured to the second support means, and further has a second portion positioned within the pressure-receiving chamber. In this case, the second partition means further comprises a plate-like member which is secured to the second portion of the hollow member such that the first and second sections of the pressure-receiving chamber are separated from each other by the hollow member and the plate-like member. The pate-like member has the above-indicated second restricted passage formed therethrough.

According to another advantageous feature of the present invention, the first partition means comprises a movable member which is deformable or displaceable in the load-receiving direction, due to a pressure difference between the pressure-receiving chamber and the equilibrium chamber. Owing to the displacement of the movable member, the elastic mount of the invention can isolate input vibrations in a frequency range which is lower than that determined by the second restricted passage, but higher than that determined by the first restricted passage.

According to a further advantageous feature of the invention, the first partition means incorporates the means for defining a first restricted passage for restricted fluid communication between the pressure-receiving chamber and the equilibrium chamber. In this case, the first partition means may comprise two partition members which cooperate with each other to define the first restricted passage. Further, the first partition means may comprise a movable member which is supported by the two partition members movably in the load-receiving direction, due to a pressure difference between the pressure-receiving chamber and the equilibrium chamber.

According to a still further advantageous feature of the invention, the first support means comprises a portion embedded in the elastic body such that a part of the portion of the first support means is exposed to the first section of the pressure-receiving chamber.

BRIEF DESCRIPTION OF THE DRAWING

The above and other objects, features and advantages of the present invention will become more apparent by reading the following description of one preferred embodiment of the invention, when considered in connection with the accompanying drawing, in which the single FIG. is an elevational view in cross section of one embodiment of a fluid-filled elastic mount of the invention in the form of an engine mount for a motor vehicle.

DESCRIPTION OF THE PREFERRED EMBODIMENT

In the FIG., reference numerals 10 and 12 respectively designate first support means in the form of a first metal support, and second support means in the form of a second support structure also made of a metal. The first metal support 10 and second support structure 12 are spaced apart from each other by a suitable distance, in mutually facing relationship in a load-receiving direction in which a vibrational load is applied to the engine mount.

The first metal support 10 has two portions consisting of a cylindrical base and a truncated cone which extends from the base toward the second support structure 12. Namely, the first metal support 10 is positioned such that a top surface of the truncated cone faces the second support structure 12. On the other hand, the second support structure 12 consists of a dished protective member 16 and a cylindrical support member 20, which have considerably larger diameters than that of the cylindrical base of the first metal support 10. The dished protective member 16 has a flange 14 which extends radially outwardly from an opening thereof, while the cylindrical support member 20 has a flange 18 at one of its axial ends. The flange 18 of the cylindrical support member 20 is fluid-tightly caulked against the flange 14 of the dished protective member 16 such that the two members 16, 20 are assembled into a cup-shaped structure which is open on the side of the first metal support 10. The cup-shaped second support structure 12 is held in co-axial relationship with the first metal support 10, as shown in the Figure.

The engine mount further includes an elastic body in the form of a cylindrical rubber block 22 which is interposed between the first metal support 10 and second support structure 12. The rubber block 22 has an upper half similar to a truncated cone, and a substantially cylindrical lower half having a constant inner diameter. The upper half of the rubber block 22 is secured by vulcanization to the first metal support 10 at its small-diameter end portion, while the lower half is secured also by vulcanization to the inner surface of the cylindrical support member 20 of the second support structure 12. Thus, the first metal support 10 and second metal support structure 12 are elastically connected via the rubber block 22.

The fist metal support 10 is provided with a mounting bolt 24, which extends from the outer surface of the support 10 in a direction away from the rubber block 22, while the dished protective member 16 of the second support structure 12 is provided at its radically central part with another mounting bolt 26, which extends outwardly from the protective member 16. The engine mount is attached to a power unit of the vehicle including an engine by the mounting bolt 24, and to a body of the vehicle by the mounting block 26. Thus, the instant engine mount is adapted to mount the engine or the power unit to the vehicle body, in such a manner as absorb and damp vibrations applied to the engine or the power unit.

The second support structure 12 serves to support a closure member in the form of a flexible rubber diaphram 28. The diaphram 28 has an outer peripheral portion which is fluid-tightly gripped by the flanges 14, 18 of the dished protective member 16 and cylindrical support member 20. Thus the diaphram 28 cooperates with the first metal support 10 and the rubber block 22 to define a fluid chamber maintained in a fluid-tight condition. The fluid chamber is filled with a suitable non-compressible fluid such as water, polyalkylene glycol or silicone oil.

The second support structure 12 further functions as support means for retaining a first partition device 30 which consists of an outer partition member 40 and an inner partition member 42. The outer peripheral portions of the outer and inner partition members 40,42 are retained by the flanges 14, 18 of the dished protective member 16 and cylindrical support member 20, via the outer peripheral portion of the rubber diaphram 28 and the lower end portion of the rubber block 22, as shown in the FIG. The above-described fluid chamber which is substantially defined by the rubber diaphram 28 and the rubber block 22 is divided by the first partition device 30, into a pressure-receiving chamber 32 and an equilibrium chamber 34. More specifically, the outer partition member 40 cooperates with the rubber block 22 and the first metal support 10 to define the pressure-receiving chamber 32, while the inner partition member 42 cooperates with the rubber diaphram 28 to define the equilibrium chamber 34. In a radically outer portion of the first partition device 30, there is formed an annular restricted passage 36 as a first restricted passage, for restricted fluid communication between the pressure-receiving chamber 32 and the equilibrium chamber 34. In a radically inner portion of the first partition device 30, there is formed a generally flat space having a suitable thickness, which accomodates a movable member in the form of a movable plate 38 made of a rubber material. The movable plate 38 is adapted to be displaceable in the load-receiving direction, due to a pressure difference between the pressure-receiving chamber 32 and the equilibrium chamber 34.

Upon application of vibrations to the engine mount, the non-compressible fluid is caused to flow between the pressure-receiving and equilibrium chambers 32, 34, via the annular restricted passage 36. Described more particularly, the annular restricted passage 36 provides a predetermined resistance to flows of the fluid therethrough, and the instant engine mount is therefore capable of effectively damping input vibrations in a frequency range which is determined by the configuration and dimensions of the passage 36. Further, the movable plate 38 which is movable in the load-receiving direction functions to effectively isolate input vibrations in a frequency range which is determined by the size of the movable plate 38 and the dimensions of the above-indicated generally flat space in which the movable plate 38 is accomodated.

In the instant embodiment, the restricted passage 36 provided for restricted fluid communication between the pressure-receiving and equilibrium chambers 32, 34 is adapted to effectively damp large-amplitude vibrations having low frequencies, such as an engine shake. On the other hand, the movable plate 38 movable in the load-receiving direction is adapted to isolate relatively small-amplitude vibrations having intermediate frequencies of around 100–150 Hz, and is therefore effective to reduce booming noises.

According to the present embodiment, the first partition device 30 is constituted by the outer partition member 40 and the inner partition member 42, as described above. The outer and inner partition members 40, 42 are superposed on each other such that radially outer portions of the members 40, 42 define the annular restricted passage 36, and such that parts of bottom walls of the members 40, 42 define the generally flat space for accomodating the movable plate 38. The outer and inner partition members 40, 42 have respective sets of holes 44 which communicate with the generally flat space, and which communicate also with the pressure-receiving chamber 32 and the equilibrium chamber 34, respectively. The movable plate 38 is subject to pressures of the non-compressible fluid in the pressure-receiving chamber 32 and equilibrium chamber 34, through the respective sets of holes 44.

The engine mount according to the present invention further has a second partition device which is constituted by a hollow member 46 and a plate-like member 54. As shown in the FIG., the hollow member 46 has a tapered portion 51 which is embedded in an axially intermediate portion of the rubber block 22 so as to separate the rubber block 22 into a small-diameter part 48 secured to the first metal support 10, and a large-diameter part 50 secured to the second support structure 12. The hollow member 46 improves the radial rigidity of the rubber block 22, and that of the engine mount.

The hollow member 46 further has a cylindrical portion 52 having a suitable dimension, which extends from a small-diameter end of the tapered portion 51, into the pressure-receiving chamber 32. In the presently preferred embodiment, the plate-like member 54 having a suitable thickness is secured to the end portion of the cylindrical portion 52 remote from the tapered portion 51. In other words, the opening of the hollow member 46 remote from the first metal support 10 is closed by the plate-like member 54. In this arrangement, the pressure-receiving chamber 32 is divided by the hollow member 46 and the plate-like member 54, into a first section 56 formed on the side of the first metal support 10, and a second section 58 formed on the side of the first partition means 30. The plate-like member 54 has a second restricted passage in the form of a round hole 60 formed through its central part. When a pressure difference occurs between the first and second sections 56, 58 of the pressure-receiving chamber 32, the non-compressibe fluid in the chamber 32 is caused to flow in a restricted manner, between the first and second sections 56, 58, through the round hole 60 formed in the plate-like member 54.

More specifically, upon application of vibrations to the instant engine mount, the pressure difference between the first and second sections 56, 58 of the pressure-receiving chamber 32 occurs due to the elastic deformation of the rubber block 22, which is caused by a relative displacement between the first metal support 10 and second support structure 12. Based on this pressure difference, the fluid in the pressure-receiving chamber 32 flows between the first and second sections 56, 58, through the round hole 60 of the plate-like member 54. Since the round hole 60 serving as a restricted passage like the annular restricted passage 36 provides a predetermined resistance to flows of the fluid therethrough, the instant engine mount can effectively isolate or reduce input vibrations having high frequencies in the neighborhood of 300 Hz, such as sounds transmitted through the vehicle engine.

In the FIG., reference numeral 62 denotes a rubber layer which is secured by vulcanization to the plate-like member 54, more precisely, to one of opposite surfaces of the member 54 on the side of the first partition device 30. The plate-like member 54 is adapted to also serve as stopper means for preventing an excessive amount of relative displacement between the first metal support 10 and second support structure 12 in the axial direction. The rubber layer 62 provided on the plate-like member 54 absorbs shocks which may occur upon abutting contacts of the plate-like member 54 with the first partition device 30.

The instant engine mount constructed as described above is capable of sufficiently damping the large-amplitude, low frequency vibrations such as the engine shake, based on the restricted fluid flows through the annular, first restricted passage 36, as described above. Simultaneously, the engine mount can effectively isolate the relatively small-amplitude vibrations of intermediate frequencies around 100-150 Hz, such as the booming noises, based on the movements of the movable plate 38 in the load-receiving direction. Further, the engine mount can also isolate the input vibrations of still smaller amplitude having comparatively high frequencies in the neighborhood of 300 Hz, such as the transmitted engine noises, based on the restricted fluid flows through the round hole 60 of the plate-like member 54, which serves as the second restricted passage. Thus, the engine mount constructed according to the principle of the invention can exhibit excellent vibration absorbing and damping characteristics, similar to those of the known engine mount which employs the operating member as described above.

In the known engine mount, when the frequencies of the input vibrations are higher than those of the vibrations which can be isolated by the restricted fluid flows through the restricted portion in the pressure-receiving chamber, the fluid is less likely to flow between the first and second sections of the pressure-receiving chamber, through the restricted portion. As a result, the pressure in one of the first and second sections, in particular, that in the second section, tends to increase, whereby the dynamic spring constant of the mount is increased. In the instant embodiment, however, the first and second sections 56, 58 of the pressure-receiving chamber 32 are partially defined by the small-diameter and large-diameter portions 48, 50 of the elastic rubber block 22, respectively. Therefore, the pressure increase within the first and second sections 56, 58 can be effectively avoided due to elastic expansion or deformation of the appropriate portions 48, 50 of the rubber block 22, whereby the vibration damping and isolating characteristics are enhanced.

In other words, the engine mount according to the present embodiment can exhibit more excellent characteristics for isolation of high frequency vibrations, than the known structure, as well as provide damping and isolating functions similar to those of the known engine mount. Thus, the present engine mount as a whole can demonstrate improved characteristics of damping and isolating vibrations in a comparatively wide range of frequencies, as compared with the known engine mount.

While the tapered portion 51 of the hollow member 46 used in the illustrated embodiment is disposed such that the rubber block 22 is divided at an axially intermediate position thereof into two parts of an almost same size, it is not necessary that the tapered portion completely separates the rubber block into two parts.

While the round hole 60 serving as the second restricted passage is formed in the central part of the plate-like member 54 in the illustrated embodiment, it is possible to provide the plate-like member with a plurality of holes which are spaced apart from each other. Further, it is possible to form the second restricted passage in the hollow member 46.

Although the second partition device in the present embodiment also serves as stopper means for preventing excessive relative displacement between the first metal support 10 and second support structure 12 in the axial direction, the second partition device is not necessarily adapted to serve as such stopper means.

Further, the present invention is applicable to mounting structures other than the engine mount for the motor vehicle.

It will be understood that the invention is by no means confined to the precise details of the illustrated embodiment, but may be embodied with various other changes, modifications and improvements which may occur to those skilled in the art, without departing from the spirit and scope of the invention defined in the following claims.

What is claimed is:

1. A fluid-filled elastic mount for flexible coupling of two members, comprising:
   first support means and second support means which are disposed opposite to each other in a load-receiving direction in which a vibrational load is applied to the elastic mount;
   an elastic body interposed between said first and second support means, for elastic connection of said first and second support means, said elastic body including a truncated cone portion having a shape similar to a truncated cone;
   a closure member secured to said second support means and cooperating with at least said elastic body to define a fluid chamber filled with a noncompressible fluid, said closure member including a flexible portion;
   first partition means for driving said fluid chamber into a pressure chamber formed on the side of said first support means, and an equilibrium chamber formed on the side of said second support means;
   means for defining a first restricted passage for restricted fluid communication between said pressure-receiving chamber and said equilibrium chamber; and
   second partition means comprising a hollow member including a first portion embedded in an intermediate portion of said truncated-cone portion of said elastic body which is intermediate said first and second support means, said truncated-cone portion being separated by said first portion of said hollow member into a small-diameter part secured to said first support means and a large-diameter part secured to said second support means, said hollow member further including a second portion positioned within said pressure-receiving chamber, said second partition means further comprising a plate-like member which is secured to said second portion of said hollow member such that said hollow member and said plate-like member divide said pressure-receiving chamber into a first section formed on the side of said first support means, and a second section formed on the side of said first partition means, said plate-like member having a second restricted passage formed therethrough for restricted fluid communication between said first and second sections of said pressure-receiving chamber.

2. A fluid-filled elastic mount according to claim 1, wherein said first support means comprises a portion embedded in said small diameter part of said elastic body such that a part of said portion of the first support means is exposed to said first section of said pressure-receiving chamber.

3. A fluid-filled elastic mount according to claim 1, wherein said first partition means incorporates said means for defining a first restricted passage for restricted fluid communication between said pressure-receiving chamber and said equilibrium chamber.

4. A fluid-filled elastic mount according to claim 3, wherein said first partition means comprises two partition members which cooperate with each other to define said first restricted passage.

5. A fluid-filled elastic mount according to claim 3, wherein said first partition means comprises two partition members, and a movable member which is supported by said two partition members movably in said load-receiving direction, due to a pressure difference between said pressure-receiving chamber and said equilibrium chamber.

6. A fluid-filled elastic mount according to claim 1, wherein said first partition means comprises a movable member which is displaceable in said low-receiving direction, due to a pressure difference between said pressure-receiving chamber and said equilibrium chamber.

7. A fluid-filled elastic mount according to claim 6, wherein the displacement of said movable member of said first partition means results in isolating vibrations having frequencies of around 100 to 150 Hz.

8. A fluid-filled elastic mount according to claim 7, wherein said second restricted passage of said plate-like member of said second partition means serves to isolate vibrations having frequencies higher than the frequencies of the vibration isolated by the displacement of said movable member.

9. A fluid-filled elastic mount according to claim 8, wherein the frequencies of the vibrations isolated by said second restricted passage comprises frequencies in the neighborhood of 300 Hz.

* * * * *